(12) United States Patent
Song et al.

(10) Patent No.: US 12,495,386 B2
(45) Date of Patent: Dec. 9, 2025

(54) POSITIONING APPARATUS, POSITIONING SERVER, AND POSITIONING METHOD

(71) Applicant: Shenzhen Yinwang Intelligent Technologies Co., Ltd., Shenzhen (CN)

(72) Inventors: Yonggang Song, Beijing (CN); Gang Wu, Beijing (CN); Yalin Liu, Shanghai (CN)

(73) Assignee: SHENZHEN YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 290 days.

(21) Appl. No.: 18/468,143

(22) Filed: Sep. 15, 2023

(65) Prior Publication Data

US 2024/0023055 A1   Jan. 18, 2024

Related U.S. Application Data

(63) Continuation of application No. PCT/CN2021/087596, filed on Apr. 15, 2021.

(51) Int. Cl.
*H04W 64/00* (2009.01)

(52) U.S. Cl.
CPC .................. *H04W 64/00* (2013.01)

(58) Field of Classification Search
None
See application file for complete search history.

(56) References Cited

U.S. PATENT DOCUMENTS

2022/0283321 A1* 9/2022 Ng .................. H04W 64/00

FOREIGN PATENT DOCUMENTS

| CN | 106772231 A | 5/2017 |
| CN | 109714822 A | 5/2019 |
| CN | 110632633 A | 12/2019 |
| WO | 2012034832 A1 | 3/2012 |

* cited by examiner

*Primary Examiner* — Suhail Khan
(74) *Attorney, Agent, or Firm* — Conley Rose, P.C.

(57) ABSTRACT

A positioning apparatus includes: a first positioning module configured to obtain location information of the positioning apparatus in real time; and an ultra-wide-band (UWB) positioning module configured to receive a positioning request message sent by a to-be-positioned tag, where the positioning request message includes identification information of the to-be-positioned tag. The UWB positioning module is further configured to determine, after receiving the positioning request message, whether the UWB positioning module is in a UWB base station mode. The UWB positioning module is further configured to perform, in the UWB base station mode, positioning measurement on the to-be-positioned tag based on the location information and the identification information.

20 Claims, 9 Drawing Sheets

POSITIONING APPARATUS, POSITIONING SERVER, AND POSITIONING METHOD

CROSS-REFERENCE TO RELATED APPLICATIONS

This application is a continuation of International Patent Application No. PCT/CN2021/087596, filed on Apr. 15, 2021, the disclosure of which is hereby incorporated by reference in its entirety.

TECHNICAL FIELD

The present disclosure relates to the field of positioning technologies, and in particular, to a positioning apparatus, a positioning server, and a positioning method.

BACKGROUND

In the field of positioning technologies, a high-precision positioning technology is a basic technology for industry digitalization. Various industries have a common requirement for high-precision positioning of a vehicle, a person, a device asset, and the like, and continuous high-precision positioning is a basic condition for continuity of a related service. However, in some cases, deployment of a positioning device is restricted by a plurality of factors such as an environment and power supply. Consequently, continuity of high-precision positioning faces a specific challenge.

Real-time kinematic (RTK) technology is usually used for outdoor high-precision positioning. However, RTK technology is applicable only to an open area. In some blocked areas, for example, areas in which half of the sky is blocked, such as a garage, a tunnel, a complex campus, and an airport terminal building, positioning precision of RTK technology cannot be reliably ensured. Ultra wide-band (UWB) technology is usually used for indoor high-precision positioning. UWB technology requires deployment of a fixed UWB base station. However, the deployment of the UWB base station is restricted by a factor like a building environment. To ensure continuous high-precision positioning both indoors and outdoors, people combine RTK technology with UWB technology. RTK technology is used for positioning in an outdoor open area, and UWB technology is used for positioning in an indoor area or a blocked area. However, during entry or exit from the indoor area or the blocked area, to ensure the continuity of high-precision positioning, redundant deployment of the UWB base station is required, and the UWB base station may not be deployed as required. This consequently affects positioning precision, and even causes a positioning interruption.

SUMMARY

The present disclosure provides a positioning apparatus, a positioning server, and a positioning method. The technical solution can ensure continuous high-precision positioning of a to-be-positioned tag.

According to a first aspect, a positioning apparatus is provided, where the apparatus includes: a first positioning module configured to obtain location information of the positioning apparatus in real time; and a UWB positioning module configured to receive a positioning request message sent by a to-be-positioned tag, where the positioning request message includes identification information of the to-be-positioned tag. The UWB positioning module is further configured to: after receiving the positioning request message, determine whether the UWB positioning module is in a UWB base station mode. The UWB positioning module is further configured to perform, in the UWB base station mode, positioning measurement on the to-be-positioned tag based on the location information and the identification information.

The positioning apparatus provided in this embodiment of the present disclosure has two positioning capabilities. The positioning apparatus may obtain a location of the positioning apparatus in real time by using the first positioning module, and perform positioning measurement on the to-be-positioned tag by using the UWB positioning module. In other words, the positioning apparatus may be used as a mobile base station to provide a positioning service for the to-be-positioned tag.

When a positioning base station connected to the to-be-positioned tag cannot provide high-precision positioning for the to-be-positioned tag, the positioning apparatus may be used as a UWB base station and jointly provide the positioning service for the to-be-positioned tag with another positioning base station, so that high-precision positioning and positioning continuity of the to-be-positioned tag are ensured.

With reference to the first aspect, in some implementations of the first aspect, the UWB positioning module includes a UWB tag mode and the UWB base station mode, and the positioning apparatus further includes: a status monitoring module configured to monitor a status of the positioning apparatus. Before the performing positioning measurement on the to-be-positioned tag based on the location information and the identification information, when the status of the positioning apparatus meets a preset condition, the UWB positioning module is further configured to: if the UWB positioning module is not in the UWB base station mode, switch from the UWB tag mode to the UWB base station mode.

The UWB positioning module in this embodiment of the present disclosure has the UWB tag mode and the UWB base station mode. When the status of the positioning apparatus meets the preset condition, if the UWB positioning module is not in the UWB base station mode, the UWB positioning module switches from the positioned UWB tag mode to the UWB base station mode that may provide the positioning service for another positioning tag, so that the UWB positioning module can perform positioning measurement on the positioning tag with the another positioning base station.

With reference to the first aspect, in an implementation of the first aspect, the UWB positioning module includes a UWB tag module and a UWB base station module. The positioning apparatus further includes: a status monitoring module configured to monitor a status of the positioning apparatus. Before the performing positioning measurement on the to-be-positioned tag based on the location information and the identification information, when the status of the positioning apparatus meets a preset condition, the UWB positioning module is further configured to: if the UWB positioning module is not in the UWB base station mode, disable the UWB tag module and enable the UWB base station module, so that the UWB positioning module enters the UWB base station mode.

With reference to the first aspect, in an implementation of the first aspect, when the positioning apparatus does not meet the preset condition, the UWB positioning module is further configured to switch from the UWB base station mode to the UWB tag mode. Alternatively, when the positioning apparatus receives first switching indication information, the UWB positioning module switches from the UWB base station mode to the UWB tag mode.

Based on this embodiment of the present disclosure, when the status of the positioning apparatus does not meet the preset condition, or when the positioning apparatus receives the first switching indication information, the UWB positioning module in the positioning apparatus switches from the UWB base station mode to the UWB tag mode, to avoid a decrease in positioning precision caused by continuing to provide the positioning service for the to-be-positioned tag.

With reference to the first aspect, in an implementation of the first aspect, when the status of the positioning apparatus does not meet the preset condition, the UWB positioning module is further configured to disable the UWB base station module and enable the UWB tag module, so that the UWB positioning module enters the UWB tag mode. Alternatively, when the positioning apparatus receives first switching indication information, the UWB positioning module disables the UWB base station module and enables the UWB tag module, so that the UWB positioning module enters the UWB tag mode.

With reference to the first aspect, in an implementation of the first aspect, the preset condition includes that a location of the positioning apparatus is known; or the preset condition includes that a location of the positioning apparatus is known and at least one of the following conditions: A speed of the positioning apparatus is less than or equal to a first preset value; and the positioning apparatus receives second switching indication information.

With reference to the first aspect, in an implementation of the first aspect, the UWB positioning module further includes: a time synchronization module configured to perform time synchronization on the positioning apparatus and a UWB base station communicating with the positioning apparatus; or configured to perform time synchronization on the positioning apparatus, the to-be-positioned tag, and a UWB base station communicating with the positioning apparatus.

With reference to the first aspect, in an implementation of the first aspect, the first positioning module is a RKT positioning module.

It should be understood that the first positioning module may alternatively be another positioning module, for example, another global navigation satellite system (GNSS) positioning module or a BLUETOOTH 5.1 positioning module.

With reference to the first aspect, in an implementation of the first aspect, the positioning apparatus is an on-board positioning apparatus.

According to a second aspect, a positioning server is provided, where the positioning server includes: a transceiver unit configured to receive first positioning information, of a to-be-positioned tag, that is sent by a first positioning base station; and a processing unit configured to determine, based on a quantity and/or distribution of base stations in the first positioning base station, to send second switching indication information to a first tag-based base station, where the second switching indication information indicates the first tag-based base station to switch from a UWB tag mode to a UWB base station mode. The transceiver unit is further configured to receive second positioning information, of the to-be-positioned tag, that is sent by the first tag-based base station in the UWB base station mode. The processing unit is further configured to calculate a location of the to-be-positioned tag based on the first positioning information and the second positioning information.

The first positioning base station may include a UWB fixed base station and/or a UWB tag-based base station.

According to this embodiment of the present disclosure, the positioning server may determine, based on the quantity and/or distribution of positioning base stations near the to-be-positioned tag, to send the second switching indication information to the first tag-based base station, to indicate the first tag-based base station to switch to the UWB base station mode, so that the positioning server can provide a positioning service for the to-be-positioned tag with another positioning base station, and high-precision positioning of the to-be-positioned tag can therefore be ensured.

With reference to the second aspect, in an implementation of the second aspect, the processing unit is further configured to determine a precision level of the location of the to-be-positioned tag.

Based on this embodiment of the present disclosure, the positioning apparatus may further determine the precision level of the location of the to-be-positioned tag, to provide reference for positioning precision.

With reference to the second aspect, in an implementation of the second aspect, the precision level is determined based on at least one of the following information: a ratio of a sum of a quantity of tag-based base stations in the first positioning base station and a quantity of tag-based base stations in the first tag-based base station to a sum of the quantity of base stations in the first positioning base station and a quantity of base stations in the first tag-based base station; a location of a tag-based base station in the first positioning base station; and a location of the first tag-based base station.

According to a third aspect, a positioning method is provided, where the method includes:

A first positioning module obtains location information of the positioning apparatus in real time; a UWB positioning module receives a positioning request message sent by a to-be-positioned tag, where the positioning request message includes identification information of the to-be-positioned tag; after receiving the positioning request message, the UWB positioning module determines whether the UWB positioning module is in a UWB base station mode; and the UWB positioning module performs, in the UWB base station mode, positioning measurement on the to-be-positioned tag based on the location information and the identification information.

With reference to the third aspect, in an implementation of the third aspect, the positioning apparatus includes a UWB tag mode and the UWB base station mode, and the method further includes: A status monitoring module monitors a status of the positioning apparatus. Before that the UWB positioning module performs positioning measurement on the to-be-positioned tag based on the location information and the identification information, when the positioning apparatus meets a preset condition, if the UWB positioning module is not in the UWB base station mode, the UWB positioning module switches from the UWB tag mode to the UWB base station mode.

With reference to the third aspect, in an implementation of the third aspect, the UWB positioning module includes a UWB tag module and a UWB base station module, and the method further includes: A status monitoring module monitors a status of the positioning apparatus. Before that the UWB positioning module performs positioning measurement on the to-be-positioned tag based on the location information and the identification information, when the status of the positioning apparatus meets a preset condition, if the UWB positioning module is not in the UWB base station mode, the UWB positioning module disables the UWB tag module and enables the UWB base station module, so that the UWB positioning module enters the UWB base station mode.

With reference to the third aspect, in an implementation of the third aspect, when the positioning apparatus does not meet the preset condition, the method further includes: The UWB positioning module switches from the UWB base station mode to the UWB tag mode. Alternatively, when the positioning apparatus receives first switching indication information, the UWB positioning module switches from the UWB base station mode to the UWB tag mode.

With reference to the third aspect, in an implementation of the third aspect, when the status of the positioning apparatus does not meet the preset condition, the method further includes: the UWB positioning module disables the UWB base station module and enables the UWB tag module, so that the UWB positioning module enters the UWB tag mode. Alternatively, when the positioning apparatus receives first switching indication information, the UWB positioning module disables the UWB base station module and enables the UWB tag module, so that the UWB positioning module enters the UWB tag mode.

With reference to the third aspect, in an implementation of the third aspect, the preset condition includes at least one of the following conditions: a speed of the positioning apparatus is less than or equal to a first preset value; a location of the positioning apparatus is known; and the positioning apparatus receives second switching indication information.

With reference to the third aspect, in an implementation of the third aspect, the method further includes: performing time synchronization on the positioning apparatus and a UWB base station communicating with the positioning apparatus; or performing time synchronization on the positioning apparatus, the to-be-positioned tag, and a UWB base station communicating with the positioning apparatus.

With reference to the third aspect, in an implementation of the third aspect, the first positioning module is an RTK positioning module.

With reference to the third aspect, in an implementation of the third aspect, the positioning apparatus is an on-board positioning apparatus.

It should be understood that, for beneficial technical effects in the implementations of the third aspect, refer to related descriptions in the first aspect. For brevity, details are not described again.

According to a fourth aspect, a positioning method is provided, where the method is applied to a positioning server and includes: receiving first positioning information, of a to-be-positioned tag, that is sent by a first positioning base station; determining, based on a quantity and/or distribution of base stations in the first positioning base station, to send second switching indication information to a first tag-based base station, where the second switching indication information indicates the first tag-based base station to switch from a UWB tag mode to a UWB base station mode; receiving second positioning information, of the to-be-positioned tag, that is sent by the first tag-based base station in the UWB base station mode; and calculating a location of the to-be-positioned tag based on the first positioning information and the second positioning information.

With reference to the fourth aspect, in an implementation of the fourth aspect, the method further includes: determining a precision level of the location of the to-be-positioned tag.

With reference to the fourth aspect, in an implementation of the fourth aspect, the precision level is determined based on at least one of the following information: a ratio of a sum of a quantity of tag-based base stations in the first positioning base station and a quantity of tag-based base stations in the first tag-based base station to a sum of the quantity of base stations in the first positioning base station and a quantity of base stations in the first tag-based base station; a location of a tag-based base station in the first positioning base station; and a location of the first tag-based base station.

According to a fifth aspect, a positioning system is provided, where the positioning system includes the positioning apparatus according to any one of the first aspect and the possible implementations of the first aspect; and/or the positioning system includes the positioning server according to any one of the second aspect and the possible implementations of the second aspect.

According to a sixth aspect, a chip is provided, where the chip includes a processor and a communication interface. The communication interface is configured to receive a signal and transmit the signal to the processor. The processor processes the signal, so that the positioning method according to any one of the third aspect and the possible implementations of the third aspect is performed, or the positioning method according to any one of the fourth aspect and the possible implementations of the fourth aspect is performed.

According to a seventh aspect, a computer-readable storage medium is provided. The computer-readable storage medium stores computer instructions. When the computer instructions are run on a computer, the positioning method according to any one of the third aspect and the possible implementations of the third aspect is performed, or the positioning method according to any one of the fourth aspect and the possible implementations of the fourth aspect is performed.

According to an eighth aspect, a computer program product is provided. When the computer program product runs on a computer, the positioning method according to any one of the third aspect and the possible implementations of the third aspect is performed, or the positioning method according to any one of the fourth aspect and the possible implementations of the fourth aspect is performed.

DESCRIPTION OF EMBODIMENTS

The following describes technical solutions of the present disclosure with reference to accompanying drawings.

Figure 1:
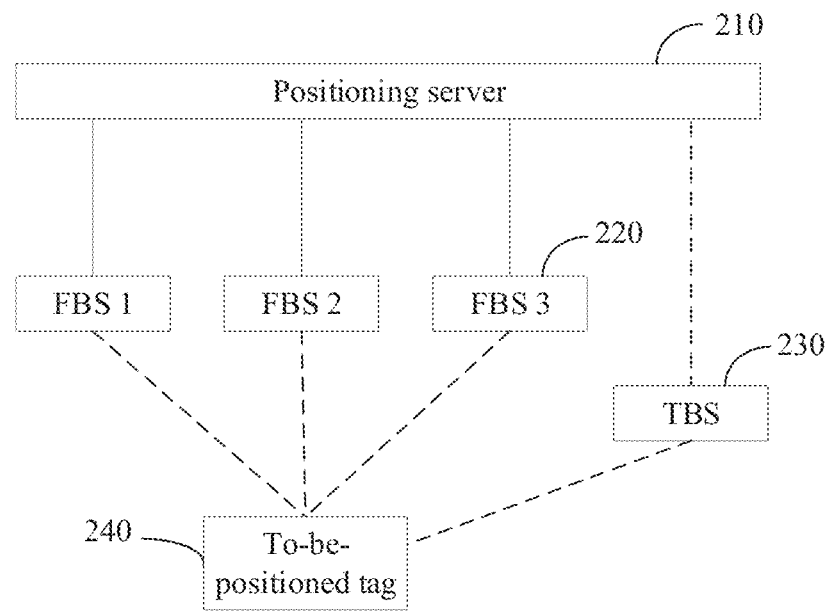
FIG. 1 is a schematic diagram of an architecture of a positioning system according to an embodiment of the present disclosure.

FIG. 1 is a schematic diagram of an architecture of a positioning system according to an embodiment of the present disclosure.

As shown in FIG. 1, the positioning system may include a positioning server 210, a fixed base station (FBS) 220, a tag-based base station (TBS) 230, and a to-be-positioned tag 240.

The positioning system may be applied to UWB positioning. The FB S 220 may be a fixedly installed UWB base station. The TBS 230 may be a movable positioning apparatus. The TBS 230 has both an RTK positioning function and a UWB positioning function, and has a UWB tag mode and a UWB base station mode. In the UWB tag mode, the TBS 230 is a to-be-positioned apparatus that needs to be positioned. In the UWB base station mode, the TBS 230 may be used as a mobile base station (auxiliary base station) to provide a positioning service for another positioning tag.

For example, in a normal case, four UWB FBSs 220 are required for UWB positioning. However, in some cases, due to impact of a factor like a building environment or power supply, the FBS 220 cannot be installed as required. In this case, FBSs 220 around the to-be-positioned tag may be insufficient to provide a positioning service for the to-be-positioned tag. Therefore, positioning precision of the to-be-positioned tag may decrease. To ensure continuous high-precision positioning of the to-be-positioned tag, the TBS 230 around the to-be-positioned tag 240 may be used as the auxiliary base station to jointly position the to-be-positioned tag 240 with the FBS 220.

As shown in FIG. 1, available base stations that are around and connected to the to-be-positioned tag 240 are an FBS 1, an FBS 2, and an FBS 3. In this case, the positioning precision of the to-be-positioned tag 240 may be affected. In this case, the TBS 230 around the to-be-positioned tag 240 may be used as the auxiliary base station, to jointly provide the positioning service for the to-be-positioned tag 240 with the FBS 1, the FBS 2, and the FBS 3, so that continuous high-precision positioning of the to-be-positioned tag 240 can be ensured.

It should be understood that a quantity of FBSs 220 is not limited in this embodiment of the present disclosure. For example, there may be two FBSs or one FBS. In this case, more TBSs may exist around the to-be-positioned tag 240, and a sum of a quantity of TBSs and the quantity of FBSs may be greater than or equal to 4, to jointly provide the positioning service for the to-be-positioned tag 240. The sum of the quantity of TBSs and the quantity of FBSs may alternatively be 3. In this case, the positioning precision of the to-be-positioned tag 240 may decrease.

It should be further understood that, heights at which the FBS 220 and the TBS 230 are deployed may not be completely the same. For example, a height at which one or more base stations (which may be the FBSs or the TBSs) are deployed is different from a height at which another base station is deployed. In this way, high-precision three dimensional (3D) positioning may be provided for the to-be-positioned tag 240.

Figure 2:
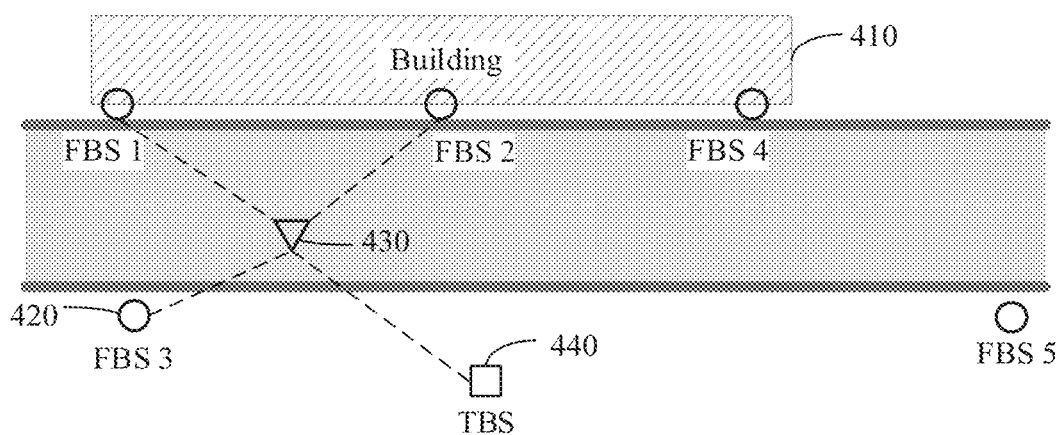
FIG. 2 is a schematic diagram of an application scenario of a positioning system according to an embodiment of the present disclosure.

FIG. 2 is a schematic diagram of an application scenario of a positioning system according to an embodiment of the present disclosure. As shown in FIG. 2, a building 410 may be a building like an airport terminal building or a viaduct. A plurality of FBSs 420 are installed near the building 410, and a to-be-positioned tag 430 is connected to the plurality of FBSs 420 to perform accurate positioning.

However, because installation of the FBS 420 is affected by a building environment, the FBS 420 may not be deployed as required. In some cases, in a moving process, the to-be-positioned tag 430 can only be connected to three fixed base stations, namely, an FBS 1, an FBS 2, and an FBS 3, and positioning precision of the to-be-positioned tag 430 is affected to some extent. In this case, a TBS 440 located near the to-be-positioned tag 430 may be used as an auxiliary base station, to provide a positioning service for the to-be-positioned tag 430 with the FBS 1, the FBS 2, and the FBS 3, so that positioning continuity and high positioning precision of the to-be-positioned tag 430 can be ensured.

The TBS 440 may be a movable positioning apparatus. For example, the TBS 440 may be an on-board UWB positioning apparatus, and is installed in a vehicle (for example, an airport ferry vehicle or a support vehicle). The vehicle may travel near the to-be-positioned tag 430. The TBS 440 may have a plurality of positioning modules. For example, the TBS 440 has an RTK positioning module and a UWB positioning module. The RTK positioning module may obtain location information of the TBS 440 in real time, so that the TBS 440 can position the to-be-positioned tag 430 based on a known location.

It should be understood that the TBS 440 may be in a static state, or may be in a moving state. In a moving process of the TBS 440, the RTK module in the TBS may dynamically obtain the location information of the TBS 440. However, when a speed of the TBS 440 is high, RTK positioning precision decreases, and the precision of positioning the to-be-positioned tag 430 by the TBS 440 also decreases. Therefore, the moving speed of the TBS 440 should be less than a preset value. For example, the speed of the TBS is less than 20 kilometers per hour (km/h).

In this embodiment of the present disclosure, the UWB positioning module in the TBS 440 may have a UWB tag mode and a UWB base station mode.

In the UWB tag mode, the TBS 440 may be used as a positioned tag. For example, in an indoor area or a blocked area, UWB positioning may be performed on the TBS 440 by using the plurality of FBSs 420 or another TBS. In the UWB base station mode, the TBS 440 may be used as a mobile UWB base station. For example, the TBS 440 may provide the positioning service for the to-be-positioned tag 430 with the plurality of FBSs 420 or another TBS.

In this embodiment of the present disclosure, when the FBS 1, the FBS 2, the FBS 3 provide the positioning service for the to-be-positioned tag 430 with the TBS 440, an installation height of at least one of the four base stations and an installation height of another base station are on different planes, that is, a specific height difference exists. Through such arrangement, a location of the to-be-positioned tag may be calculated based on positioning information of the to-bepositioned tag from the plurality of base stations, where the location includes three-dimensional (3D) information of the to-be-positioned tag.

In an example, the location of the to-be-positioned tag may be calculated by using a positioning server.

In another example, the location of the to-be-positioned tag may be calculated by using the to-be-positioned tag.

A process of calculating the location of the to-be-positioned tag by using the positioning server or the to-be-positioned tag is described below with reference to a specific embodiment, and details are not described herein.

Based on this embodiment of the present disclosure, in some cases, when a quantity of UWB fixed base stations that can be connected to the to-be-positioned tag is insufficient, the positioning precision of the to-be-positioned tag decreases or positioning is interrupted. In this case, the movable TBS near the to-be-positioned tag may be used as the auxiliary base station to jointly provide the positioning service for the to-be-positioned tag with the UWB fixed base station, so that the positioning continuity and the positioning precision of the to-be-positioned tag can be ensured.

FIG. 3 is a schematic diagram of another application scenario of a positioning system according to an embodiment of the present disclosure. As shown in FIG. 3, this scenario shows a positioning process in which a to-be-positioned tag travels from an open area into a blocked area and travels out of the blocked area.

The blocked area 510 may be a tunnel, the to-be-positioned tag 530 may be an on-board positioning apparatus, and a plurality of UWB fixed base stations FBSs 520 are installed on two sides of a tunnel road.

The to-be-positioned tag 530 may have a plurality of positioning functions. For example, the to-be-positioned tag 530 may have an RTK positioning module and a UWB positioning module. In the open area before the to-be-positioned tag 530 travels into the blocked area 510, the RTK positioning module may be used to obtain location information of the to-be-positioned tag 530 in real time. In the blocked area, because a signal of the RTK positioning module is weak, the RTK positioning module is switched to the UWB positioning module to obtain the location information of the to-be-positioned tag 530 in real time. However, when the to-be-positioned tag 530 travels into the blocked area and travels out of the blocked area, that is, in a positioning mode switching process, positioning continuity of the to-be-positioned tag 530 may be affected.

Figure 3A:
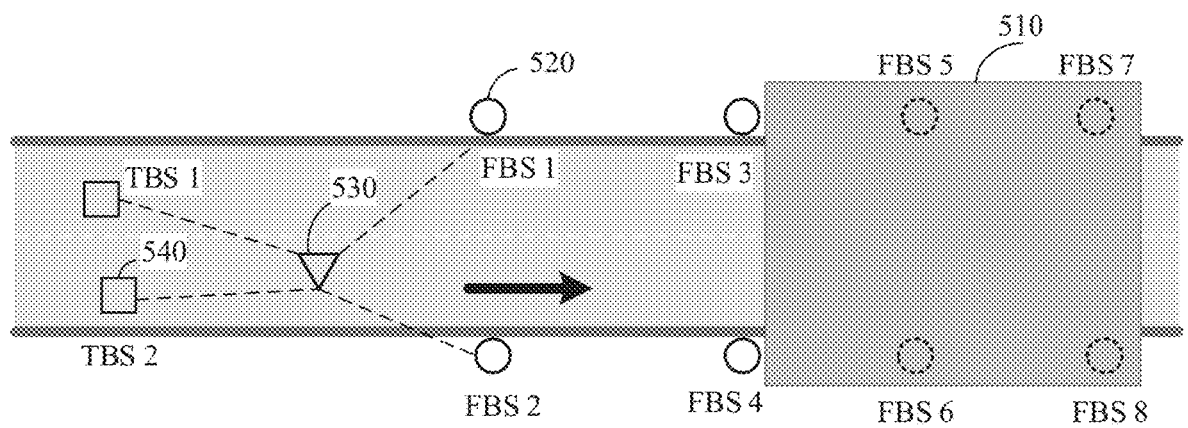
FIG. 3A and FIG. 3B are schematic diagrams of another application scenario of a positioning system according to an embodiment of the present disclosure.

As shown in FIG. 3A, when the to-be-positioned tag 530 is about to travel into the blocked area 510, to ensure the continuity of high-precision positioning of the to-be-positioned tag 530, some UWB fixed base stations FBSs 520 are usually deployed in advance before the to-be-positioned tag 530 enters the blocked area. In this way, it can be ensured that stable UWB positioning can be performed on the to-be-positioned tag 530 before the to-be-positioned tag 530 enters the blocked area 510.

At a moment, the to-be-positioned tag 530 travels near the blocked area 510, and switches from RTK positioning to UWB positioning. However, because only two connectable FBSs 520, namely, an FBS 1 and an FBS 2, exist near the to-be-positioned tag 530, it is clear that a high-precision positioning requirement of the to-be-positioned tag cannot be met. In this case, a TBS 540 near the to-be-positioned tag 530 may be used as an auxiliary base station. Refer to FIG. 3. A TBS 1 and a TBS 2 exist near the to-be-positioned tag 530, and the TBS 1 and the TBS 2 may jointly provide a positioning service for the to-be-positioned tag 530 with the FBS 1 and the FBS 2. In this case, the to-be-positioned tag 530 is connected to four positioning base stations, so that high-precision positioning can be ensured.

It should be understood that there may be more TBSs 540. For example, a total of five positioning base stations including a TBS 3 (not shown in the figure) exist. This is not limited in this embodiment of the present disclosure.

The TBS 1 and the TBS 2 may be located within a preset range of a distance from the to-be-positioned tag 530, to avoid a decrease in positioning precision due to an excessively long distance.

The TBS 1 and the TBS 2 may be on-board positioning devices, and are, for example, installed in a vehicle traveling around the to-be-positioned tag 530.

It should be understood that, in this embodiment of the present disclosure, although the FBS 1 and the FBS 2 are also deployed in redundancy, when the TBS 540 is not used as the auxiliary base station, a larger quantity of FBSs may be deployed before the blocked area, so that the continuity of high-precision positioning of the to-be-positioned tag can be ensured.

It should be understood that, in this embodiment of the present disclosure, the RTK positioning module in the to-be-positioned tag may also be replaced with another positioning module, for example, a Global Positioning System (GPS) positioning module.

Figure 3B:
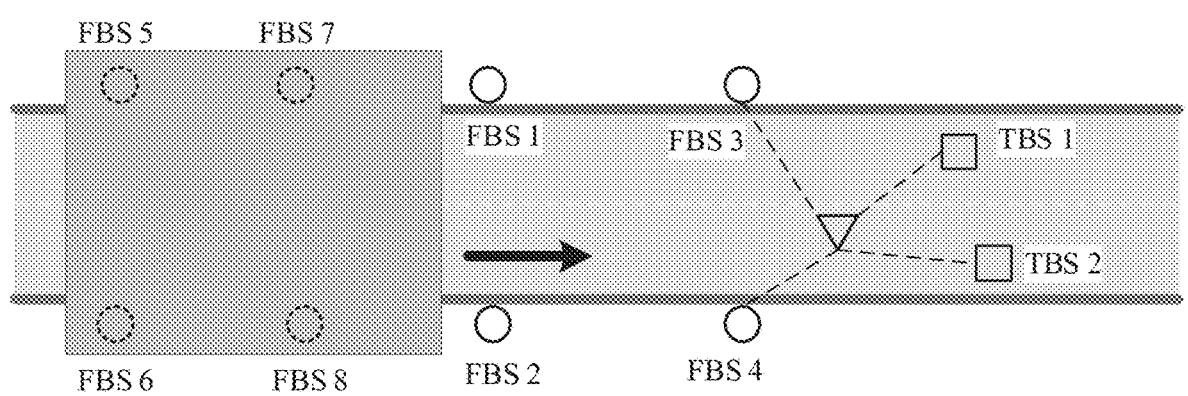

Similarly, as shown in FIG. 3B, when the to-be-positioned tag 530 just travels out of the blocked area 510, the to-be-positioned tag 530 needs to switch from UWB positioning to RTK positioning. However, starting RTK positioning involves satellite locking, re-solving an integer ambiguity, and the like, and this consumes specific time, for example, 10 seconds(s). Therefore, to ensure high-precision positioning and the positioning continuity, some UWB fixed base stations FBSs need to be deployed outside the blocked area, so that stable UWB positioning can be performed on the to-be-positioned tag before RTK positioning is available.

Based on this embodiment of the present disclosure, when the to-be-positioned tag travels into or out of the blocked area, the fixed base stations connected to the to-be-positioned tag are insufficient for continuous high-precision positioning. In this case, the TBS around the to-be-positioned tag may be used as the auxiliary base station to provide the positioning service for the to-be-positioned tag with the UWB fixed base station, so that the positioning continuity and the positioning precision of the to-be-positioned tag can be ensured.

In some embodiments, for example, in an airport or a production campus, there may be a positioning requirement for a person or an unpowered asset. However, the UWB fixed base station may not be deployed in the open area, and positioning is therefore difficult. However, in most cases, some operating vehicles may exist near the person or the unpowered asset that needs to be positioned. The operating vehicle may be considered as a mobile base station to provide positioning for the person or the unpowered asset.

FIG. 4 is a schematic diagram of another application scenario of a positioning system according to an embodiment of the present disclosure. As shown in FIG. 4, no UWB FBS exists around a to-be-positioned tag 620. In this case, a plurality of TBSs 610 near the to-be-positioned tag 620 may be used for positioning.

Figure 4A:
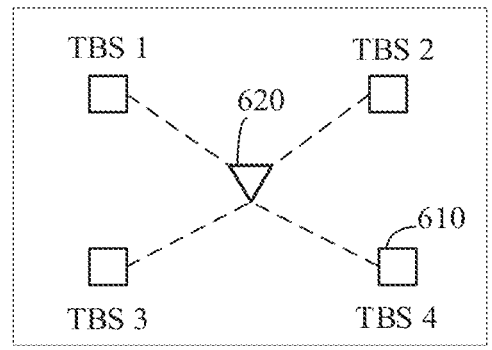
FIG. 4A and FIG. 4B are schematic diagrams of another application scenario of a positioning system according to an embodiment of the present disclosure.

Refer to FIG. 4A. When four TBSs 610 exist around the to-be-positioned tag 620, the to-be-positioned tag 620 may establish connections to a TBS 1, a TBS 2, a TBS 3, and a TBS 4. In this case, the TBS 1, the TBS 2, the TBS 3, and the TBS 4 may be used as mobile base stations to provide a positioning service for the to-be-positioned tag 620. In this case, high-precision positioning of the to-be-positioned tag 620 may also be ensured.

In this embodiment of the present disclosure, when four TBS base stations are used for positioning, positioning precision may be improved from 5 to 15 meters of common satellite positioning to 0.5 meter. It can be learned that this solution improves the positioning precision and positioning reliability to some extent.

When a quantity of TBSs is small, the positioning precision of the to-be-positioned tag 620 is affected to some extent.

Figure 4B:
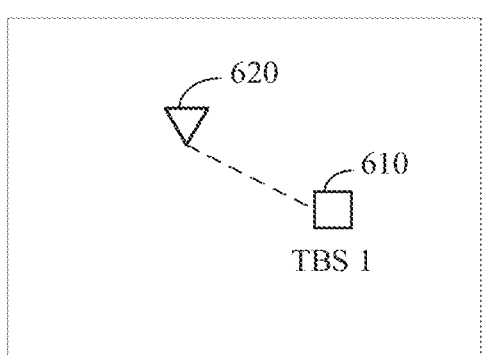

Refer to FIG. 4B. When only one TBS 1 exists around the to-be-positioned tag 620, in other words, when the to-be-positioned tag 620 can be connected to only one TBS 1, existence detection may be performed on the to-be-positioned tag 620 by using the TBS 1, and the positioning precision of the to-be-positioned tag 620 is an effective coverage radius of the TBS. The effective coverage radius may be a preset value. For example, the preset value may be 50 meters, 60 meters, or the like. In comparison with common satellite positioning, this solution has lower power consumption and extends endurance of positioning an unpowered device.

Further, in this embodiment of the present disclosure, the to-be-positioned tag can implement high-precision positioning or existence detection provided that the to-be-positioned tag has a UWB positioning module. The to-be-positioned tag does not need to have another positioning module, for example, an RTK positioning module. This can reduce costs of a to-be-positioned apparatus.

Figure 5:
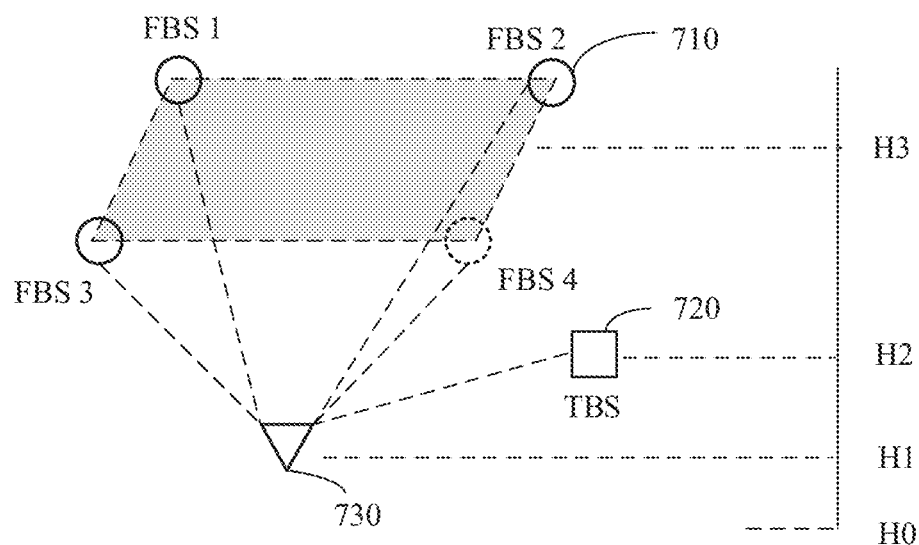
FIG. 5 is a schematic diagram of installation distribution of positioning base stations according to an embodiment of the present disclosure.

FIG. 5 is a schematic diagram of installation distribution of positioning base stations according to an embodiment of the present disclosure. As shown in FIG. 5, the positioning base stations participating in a to-be-positioned tag 730 include a UWB FBS 710 and a UWB tag-based base station TBS 720.

The fixed base station FBS 710 includes three base stations: an FBS 1, an FBS 2, and an FBS 3. When the FBS 1, the FBS 2, and the FBS 3 are installed, installation heights may be the same. To be specific, a plane including the three base stations FBS 1, FBS 2, and FBS 3 may be parallel to a horizontal plane. However, an installation height of the TBS 720 may be different from the installation height of the FBS 710. To be specific, a vertical distance between the TBS 720 and the horizontal plane is different from a vertical distance between the FBS 710 and the horizontal plane.

Refer to FIG. 5. Assuming that a location of the horizontal plane is H0, a vertical distance between the to-be-positioned tag 730 and the horizontal plane is H1, the vertical distance between the TBS 720 and the horizontal plane is H2, and a distance between the plane including the three base stations FBS 1, FBS 2, and FBS 3 and the horizontal plane is H3, where H3 is different from H2. In this way, three-dimensional high-precision positioning of the to-be-positioned tag 730 can be implemented.

For example, the FBS 710 is usually installed on a building, and is installed at a high height. The TBS 720 may be an on-board positioning apparatus, and is usually installed at a height lower than the installation height of the FBS 710.

In this embodiment of the present disclosure, the FBS 710 may further include an FBS 4. An installation height of the FBS 4 may be the same as or different from that of the FBS 1. When the FBS 4 exists, positioning precision of the to-be-positioned tag 730 can increase.

In this embodiment of the present disclosure, the base stations participating in positioning may alternatively be two FBSs and two or more TBSs, but an installation height of at least one of the base stations needs to be different from that of another base station.

Based on this embodiment of the present disclosure, when the height at which the TBS participating in positioning is deployed is different from a height at which another FBS base station is deployed, three-dimensional high-precision positioning of the to-be-positioned tag can be implemented.

Figure 6:
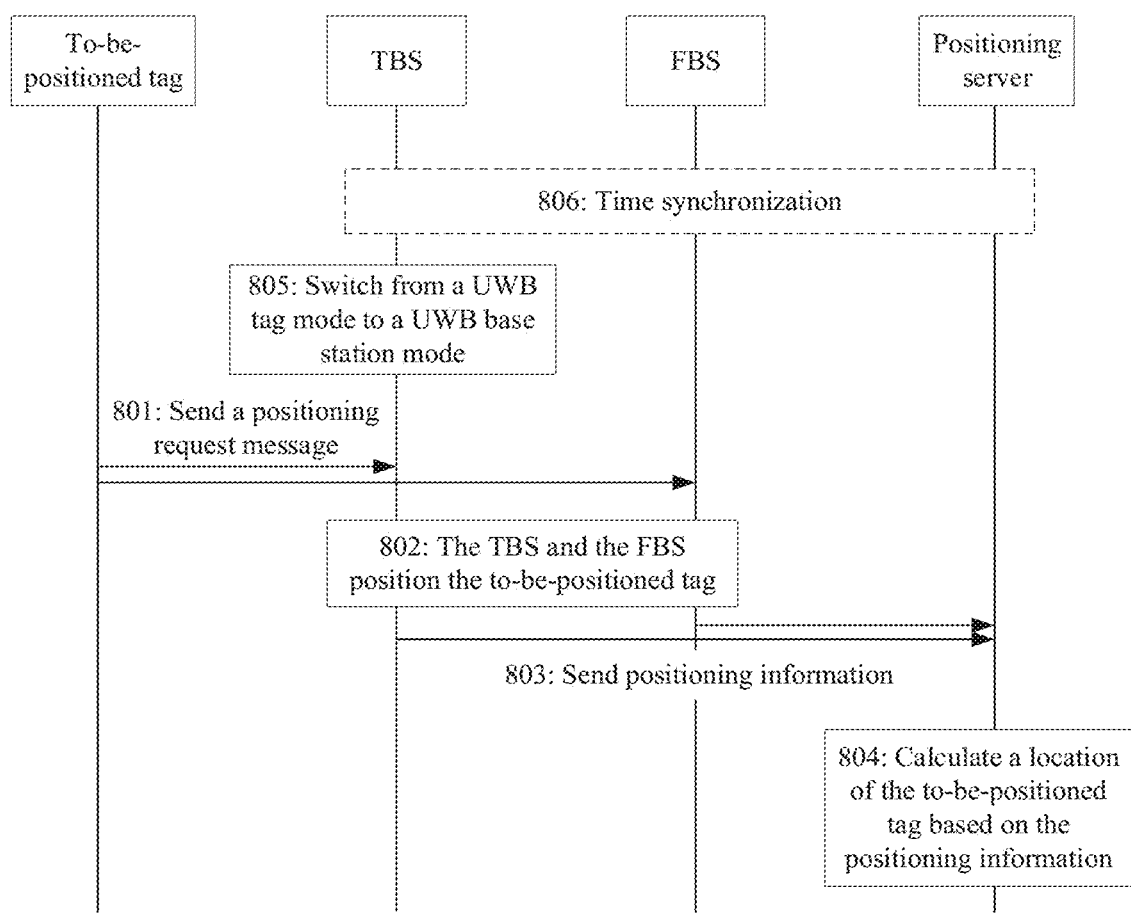
FIG. 6 is a schematic flowchart of a positioning method according to an embodiment of the present disclosure.

FIG. 6 is a schematic flowchart of a positioning method according to an embodiment of the present disclosure. As shown in FIG. 6, the method may include step 801 to step 804.

801: A to-be-positioned tag sends a positioning request message to a TBS and an FBS.

It should be understood that, the positioning request message is a UWB signal, and the positioning request message may include identification information of the to-be-positioned tag. For example, the to-be-positioned tag may broadcast the positioning request message when the to-be-positioned tag needs to be positioned, and both the TBS and the FBS within a threshold range of a distance from the to-be-positioned tag may receive the positioning request message.

The to-be-positioned tag may be an on-board positioning apparatus, and the on-board positioning apparatus may broadcast the positioning request message in real time in a traveling process of a vehicle.

802: The TBS and the FBS perform positioning measurement on the to-be-positioned tag based on the positioning request message.

When receiving the positioning request message, the TBS and the FBS may perform UWB positioning on the to-be-positioned tag in a plurality of manners.

In a possible implementation, a time of flight (TOF) distance measurement method may be used, for example, single-side bidirectional distance measurement or dual-side bidirectional distance measurement.

In another possible implementation, an angle of arrival (AOA) distance measurement method may be used to measure an angle of arrival of a signal that is sent by the to-be-positioned tag and that arrives at the base station.

In another possible implementation, a time difference of arrival (TDOA) positioning method, also referred to as a hyperbolic positioning method, may be used. When the to-be-positioned tag sends the UWB signal outwards, two base stations at different distances receive the signal at different time points. A principle of TDOA positioning is to determine a location of the tag based on a time difference between time points at which a plurality of base stations receive the signal.

In a possible implementation, the time of arrival (TOA) positioning method may be further used, and positioning is performed by measuring time points at which the to-be-positioned tag reaches a plurality of positioning base stations.

It should be understood that positioning may be performed by using a method of combining the foregoing plurality of methods. This is not limited in this embodiment of the present disclosure.

803: The TBS and the FBS send positioning information of the to-be-positioned tag to a positioning server.

It should be understood that, the positioning information is not a final location of the to-be-positioned tag, but measurement information about measuring the to-be-positioned tag by the base station by using a specific method.

After the information is sent to the positioning server, the positioning server performs final calculation.

804: The positioning server calculates the location of the to-be-positioned tag based on the positioning information.

After receiving the positioning information sent by the plurality of base stations, the positioning server performs comprehensive calculation based on the positioning information, to obtain the accurate location of the to-be-positioned tag.

Optionally, the positioning server may further calculate a precision level of the location of the to-be-positioned tag.

For example, the positioning server may determine the precision level based on a proportion of a quantity of TBSs or FBSs in base stations participating in positioning; or determine the precision level based on a location of the TBS or FBS.

Optionally, the positioning server may further send the calculated location of the to-be-positioned tag and the calculated precision level to the to-be-positioned tag.

When participating in positioning, the TBS is used as a movable auxiliary base station, and positioning precision of the TBS is lower than positioning precision of the FBS. Therefore, a precision level may be determined based on information such as a quantity of TBSs participating in positioning and locations of the TBSs, and the precision level may be used as a reference for positioning precision.

Based on this embodiment of the present disclosure, the TBS and the FBS position the to-be-positioned tag based on the positioning request message sent by the to-be-positioned tag, and send the positioning information of the to-be-positioned tag to the positioning server. The positioning server calculates the accurate location of the to-be-positioned tag. In this technical solution, when the quantity of FBSs is insufficient, the TBS is used as the auxiliary base station, so that high-precision positioning and positioning continuity of the to-be-positioned tag can be ensured.

Optionally, before step 801, the method may further include step 805.

805: The TBS switches from a UWB tag mode to a UWB base station mode when the TBS meets a preset condition.

The TBS may have the UWB tag mode and the UWB base station mode. In the UWB tag mode, the TBS may be a to-be-positioned apparatus that needs to be positioned. In the UWB base station mode, the TBS may be used as a mobile base station to provide a positioning service for the to-be-positioned tag.

The TBS may further include a status monitoring module configured to monitor a status of the TBS in real time. When the status monitoring module detects that the TBS meets the preset condition, the TBS switches from the UWB tag mode to the UWB base station mode.

In this embodiment of the present disclosure, the preset condition may include that the location of the TBS is known, or the preset condition may include that the location of the TBS is known and at least one of the following conditions:

A speed of the TBS is less than or equal to a first preset value; and the TBS receives first switching indication information.

For example, the speed of the TBS is less than the first preset value, and the first preset value may be 20 km/h, 30 km/h, or the like. When the moving speed of the TBS is high, a positioning error may increase.

Specifically, the location of the TBS is known. For example, the TBS further has another positioning module, for example, an RTK positioning module or a GPS positioning module, to obtain the location of the TBS. That the location of the TBS is known is beneficial to positioning the to-be-positioned tag.

Specifically, when receiving second switching indication information, the TBS may also switch from the UWB tag mode to the UWB base station mode.

The second switching indication information may be sent by the positioning server. In some cases, the positioning server determines that a quantity of positioning base stations (including the FBS and the TBS) around the to-be-positioned tag is insufficient, and this causes a decrease in positioning precision of the to-be-positioned tag or a positioning interruption. In this case, the positioning server may send the first switching indication information to another one or more TBSs around the to-be-positioned tag, to indicate the one or more TBSs to switch to the UWB base station mode, to provide the positioning service for the to-be-positioned tag, so that the positioning precision of the to-be-positioned tag can be improved, and the positioning continuity of the to-be-positioned tag can be ensured.

In some other cases, although the location of the TBS located near the to-be-positioned tag may be known and the speed of the TBS may be lower than the first preset value, the positioning server determines that there are a large quantity of positioning base stations around the to-be-positioned tag, and a high-precision positioning requirement can be met. In this case, that the TBS switches to the UWB base station mode causes a waste of resources. Therefore, the first switching indication information is not sent to the TBS, or another piece of indication information is sent to indicate the TBS not to perform switching. Alternatively, the TBS is already in the UWB base station mode. In this case, the second switching indication information may be sent to the TBS, where the second switching indication information indicates the TBS to switch from the UWB base station mode to the UWB tag mode. This technical solution helps reduce resource consumption of the TBS.

Optionally, when the status monitoring module detects that the status of the TBS does not meet the foregoing preset condition, the TBS switches from the UWB base station mode to the UWB tag mode. Alternatively, when the TBS receives the first switching indication information, the TBS switches from the UWB base station mode to the UWB tag mode.

Optionally, before step 805, the method may further include step 806.

806: The positioning server performs time synchronization between the TBS and the FBS and/or between the to-be-positioned tag and the TBS and the FBS.

It should be understood that in step 806, the positioning server may perform, according to different positioning methods, time synchronization between the TBS and the FBS and between the to-be-positioned tag and the TBS and the FBS.

For example, when the TDOA in the foregoing positioning method is used, time synchronization needs to be performed between the positioning base stations, but time synchronization does not need to be performed between the to-be-positioned tag and the positioning base stations.

Alternatively, when the TOA in the foregoing positioning method is used, time synchronization needs to be performed between the positioning base stations, and time synchronization also needs to be performed between the to-be-positioned tag and the positioning base stations.

Step 806 is an optional step. When the TOF or the AOA in the foregoing positioning method is used, time synchronization does not need to be performed between the positioning base stations and between the to-be-positioned tag and the positioning base stations. However, when a method of combining at least two of the foregoing positioning methods is used, and when time synchronization between the positioning base stations is required, time synchronization still needs to be performed between the positioning base stations.

Figure 7:
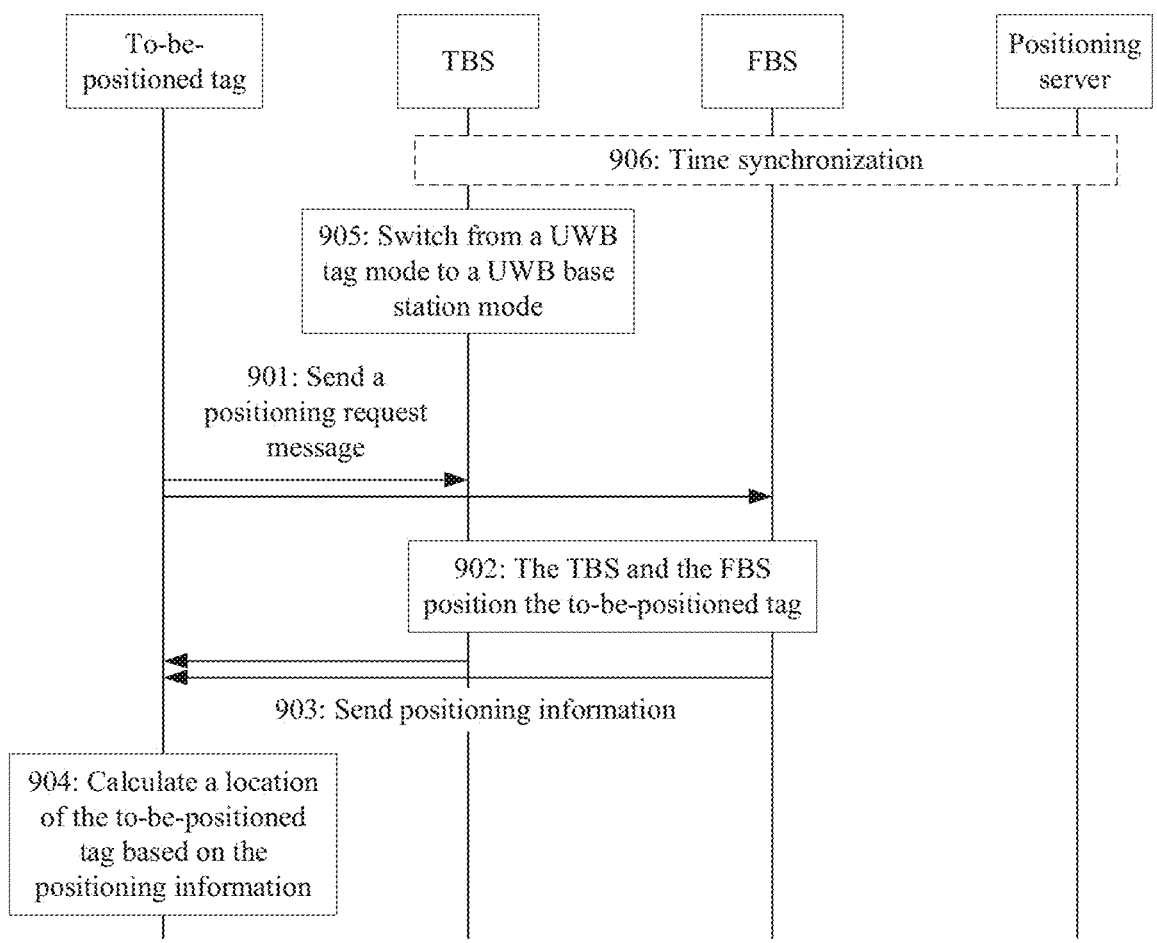
FIG. 7 is a schematic flowchart of another positioning method according to an embodiment of the present disclosure.

FIG. 7 is a schematic flowchart of another positioning method according to an embodiment of the present disclosure. As shown in FIG. 7, the method may include step 901 to step 904.

901: A to-be-positioned tag sends a positioning request message to a TBS and an FBS, where the positioning request message may include identification information of the to-be-positioned tag.

902: The TBS and the FBS position the to-be-positioned tag based on the positioning request message.

For the foregoing steps 901 to 902, refer to related descriptions of steps 801 to 802. For brevity, details are not described again.

903: The TBS and the FBS send positioning information of the to-be-positioned tag to the to-be-positioned tag.

904: The to-be-positioned tag calculates a location of the to-be-positioned tag based on the positioning information.

In this step, that the location of the to-be-positioned tag is finally calculated and placed in the to-be-positioned tag may be understood as replacing the positioning server in step 804 with the to-be-positioned tag. For related descriptions, refer to step 804.

Optionally, the method may further include step 905.

905: The TBS switches from a UWB tag mode to a UWB base station mode when the TBS meets a preset condition.

It should be understood that for step 905, refer to related descriptions of step 805. For brevity, details are not described again.

Optionally, before step 905, the method may further include step 906.

906: A positioning server performs time synchronization between the TBS and the FBS and/or between the to-be-positioned tag and the TBS and the FBS.

It should be understood that for step 906, refer to related descriptions of step 806. For brevity, details are not described again.

Based on this embodiment of the present disclosure, the TBS and the FBS position the to-be-positioned tag based on the positioning request message sent by the to-be-positioned tag, and send positioning information of the to-be-positioned tag to the to-be-positioned tag, so that the to-be-positioned tag calculates the accurate location of the to-be-positioned tag. In this technical solution, when the quantity of FBSs is insufficient, the TBS is used as the auxiliary base station, so that high-precision positioning and positioning continuity of the to-be-positioned tag can be ensured.

Figure 8:
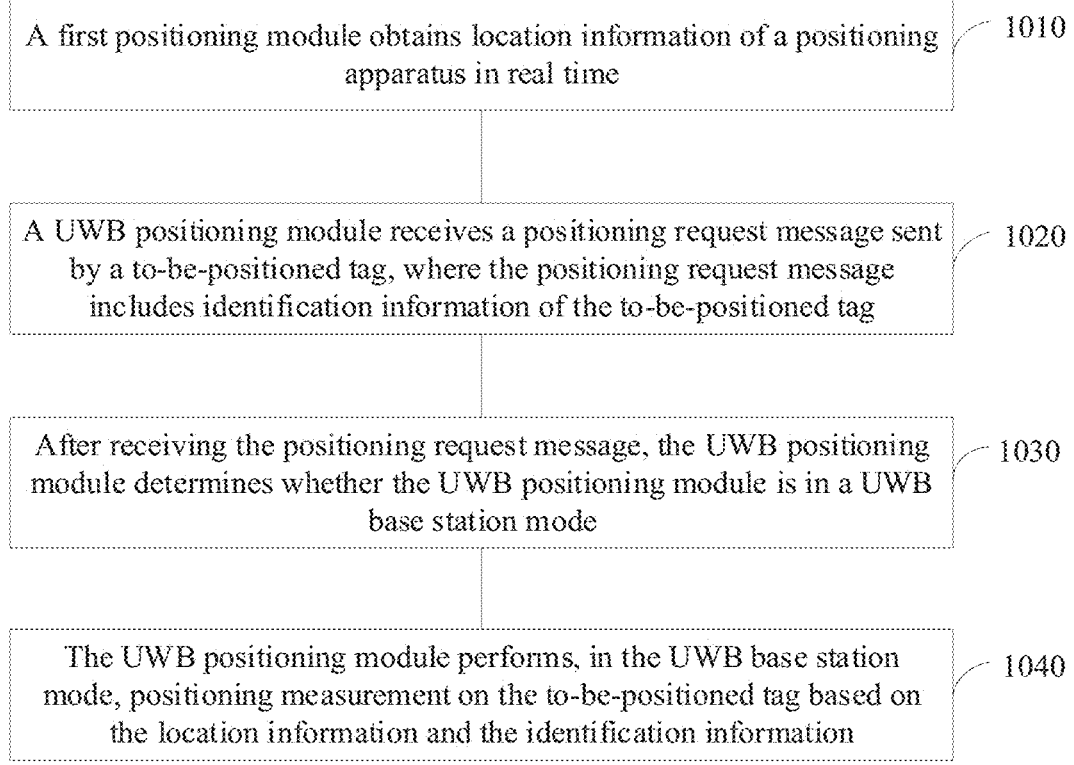
FIG. 8 is a schematic flowchart of another positioning method according to an embodiment of the present disclosure.

FIG. 8 is a schematic flowchart of a positioning method according to an embodiment of the present disclosure. As shown in FIG. 8, the method may be applied to a movable positioning apparatus, and the method may include step 1010 to step 1040.

1010: A first positioning module obtains location information of the positioning apparatus in real time.

The first positioning module in the movable positioning apparatus obtains the location information of the positioning apparatus in real time.

The first positioning module may be an RTK module, or may be another GNSS positioning module, or the first positioning module may alternatively be a BLUETOOTH 5.1 positioning module. The GNSS positioning module may include a GPS positioning module, a beidou navigation satellite system (BDS) positioning module, a galileo satellite navigation system (GALILEO) positioning module, and a GNSS positioning module. It should be understood that the RTK positioning module is a positioning module that performs, based on the GNSS positioning module, positioning enhancement by using a differential technology, and can greatly improve positioning precision.

In a process in which the movable positioning apparatus moves, the first positioning module may obtain the location information of the positioning apparatus in real time.

1020: A UWB positioning module receives a positioning request message sent by a to-be-positioned tag, where the positioning request message includes identification information of the to-be-positioned tag.

When the to-be-positioned tag needs to be positioned, the to-be-positioned tag may broadcast the positioning request message to surroundings, where the positioning request message is a UWB signal, and the positioning request message is used by a UWB base station to perform positioning measurement on the to-be-positioned tag.

The UWB positioning module in the movable positioning apparatus located around the to-be-positioned tag may receive the positioning request message sent by the to-be-positioned tag, where the positioning request message may include the identification information of the to-be-positioned tag, for example, a device identifier, so that the UWB positioning module may determine a specific to-be-positioned tag.

1030: After receiving the positioning request message, the UWB positioning module determines whether the UWB positioning module is in a UWB base station mode.

After receiving the positioning request message, the UWB positioning module may determine whether the UWB positioning module is in the UWB base station mode. To be specific, the UWB positioning module determines whether the UWB positioning module may perform positioning measurement.

1040: The UWB positioning module performs, in the UWB base station mode, positioning measurement on the to-be-positioned tag based on the location information and the identification information.

The UWB positioning module performs positioning measurement on the to-be-positioned tag based on the location information, of the positioning apparatus, that is obtained by the first positioning module and the identification information of the to-be-positioned tag in the positioning request message.

It should be understood that a positioning measurement method may be one or a combination of the foregoing TOA, TDOA, TOF, and AOA.

It should be understood that the positioning apparatus sends a positioning measurement result of the to-be-positioned tag to a positioning server, and the positioning server calculates an accurate location of the to-be-positioned tag based on positioning measurement results of a plurality of positioning apparatuses or positioning measurement results of the positioning apparatus and another base station. Alternatively, the positioning apparatus sends a positioning measurement result of the to-be-positioned tag to the to-be-positioned tag, and the to-be-positioned tag calculates an accurate location of the to-be-positioned tag based on positioning measurement results of a plurality of positioning apparatuses or positioning measurement results of the positioning apparatus and another base station.

Based on this embodiment of the present disclosure, the movable positioning apparatus has a plurality of positioning modules, and may obtain a location of the movable positioning apparatus in real time by using the first positioning module, and provide a positioning service for the UWB to-be-positioned tag based on the location and the identification information in the received positioning request message, so that the movable positioning apparatus may be used as the UWB base station in a case in which a quantity of UWB fixed base stations around the to-be-positioned tag is insufficient or distribution of the UWB fixed base stations around the to-be-positioned tag is uneven. In this way, high-precision positioning and positioning continuity of the to-be-positioned tag can be ensured.

Optionally, the UWB positioning module includes a UWB tag mode and the UWB base station mode, and the method may further include: monitoring a status of the positioning apparatus; and before the UWB positioning module performs positioning measurement on the to-be-positioned tag based on the location information and the identification information, when the positioning apparatus meets a preset condition, if the UWB positioning module is not in the UWB base station mode, switching, by the UWB positioning module, from the UWB tag mode to the UWB base station mode.

When the UWB positioning module is in the UWB tag mode, the UWB positioning module may be used as a positioned apparatus.

For example, the positioning apparatus including the UWB positioning module is an on-board positioning apparatus. In some areas such as an underground garage or a tunnel, the positioning precision may be affected due to a poor satellite positioning signal. In this case, a UWB positioning technology may be used to position the positioning apparatus.

When the positioning apparatus is in the UWB base station mode, the positioning apparatus may be used as a mobile base station to provide the positioning service for another to-be-positioned tag.

For example, the positioning apparatus is the on-board positioning apparatus. In an area that approaches the tunnel, to ensure entrance into a stable UWB positioning state in advance, some UWB fixed base stations need to be deployed outside the tunnel. When a quantity of UWB base stations that may be connected to the to-be-positioned tag is insufficient, the positioning precision may decrease or positioning may be interrupted. In this case, one or more positioning apparatuses in the UWB base station mode near the to-be-positioned tag may be used as the mobile base station to provide the positioning service for the to-be-positioned tag.

The status of the positioning apparatus may be whether a location of the positioning apparatus is known or whether a speed of the positioning apparatus is within a specific range.

The status of the positioning apparatus may alternatively be a battery level of the positioning apparatus or the like, and is used by the positioning apparatus to determine whether to perform assisted positioning or the like.

For example, when the battery level of the positioning apparatus is lower than a preset value, the positioning apparatus may choose, for a purpose of endurance of the positioning apparatus, whether to provide the positioning service for another positioning tag.

Optionally, the UWB positioning module includes a UWB tag module and a UWB base station module, and the method may further include: A status monitoring module monitors a status of the positioning apparatus. Before the UWB positioning module performs positioning measurement on the to-be-positioned tag based on the location information and the identification information, when the status of the positioning apparatus meets a preset condition, if the UWB positioning module is not in the UWB base station mode, the UWB positioning module disables the UWB tag module and enables the UWB base station module, so that the UWB positioning module enters the UWB base station mode.

The UWB positioning module includes the UWB tag module and the UWB base station module. The UWB tag module corresponds to the UWB tag mode that needs to be positioned, and the UWB base station module corresponds to the UWB base station mode that may provide the positioning service for another positioning tag. When the status of the positioning apparatus meets the preset condition, if the UWB positioning module is not in the UWB base station mode, the UWB positioning module may disable the UWB tag module and enable the UWB base station module, so that the UWB positioning module enters the UWB base station mode.

Optionally, when the status of the positioning apparatus does not meet the preset condition, the method may further include:

The UWB positioning module disables the UWB base station module and enables the UWB tag module, so that the UWB positioning module enters the UWB tag mode.

Alternatively, when the positioning apparatus receives first switching indication information, the UWB positioning module disables the UWB base station module and enables the UWB tag module, so that the UWB positioning module enters the UWB tag mode.

In this embodiment of the present disclosure, when the status of the positioning apparatus does not meet the preset condition, it means that when the positioning apparatus continues to be used as the mobile base station to provide the positioning service for the to-be-positioned tag, positioning precision of the to-be-positioned tag decreases. Therefore, enabling the positioning apparatus to enter the UWB tag mode helps avoid a decrease in the positioning precision caused by continuing to provide the positioning service for the to-be-positioned tag.

In another possible implementation, even if the status of the positioning apparatus meets the preset condition, when receiving the first switching indication information, the positioning apparatus may also perform module switching, for example, disable the UWB base station module and enable the UWB tag module, so that the UWB positioning module enters the UWB tag mode.

Specifically, in some cases, when the quantity of UWB fixed base stations around the to-be-positioned tag or a quantity of UWB tag-based base stations around the to-be-positioned tag is sufficient, that is, when high-precision positioning of the to-be-positioned tag can be satisfied, another positioning apparatus may not be used even in the UWB base station mode. Therefore, the server may send the switching indication information to the positioning apparatus, to indicate the positioning apparatus to enter the UWB tag mode.

Optionally, the preset condition includes that the location of the positioning apparatus is known, or the preset condition includes that the location of the positioning apparatus is known and at least one of the following conditions:

The speed of the positioning apparatus is less than or equal to a first preset value; and the positioning apparatus receives second switching indication information.

The first preset value may be 25 km/h or 30 km/h. A specific value of the first preset value is not limited in this embodiment of the present disclosure.

The second switching indication information may be sent by the positioning server, and indicates the positioning apparatus to switch from the UWB tag mode to the UWB base station mode.

For example, the positioning server determines, based on the quantity of UWB fixed base stations around the to-be-positioned tag, that the positioning precision of the to-be-positioned tag decreases. In this case, the positioning server may send the second switching indication information to a positioning apparatus near the to-be-positioned tag.

Optionally, when the positioning apparatus does not meet the preset condition, the method may further include:

The UWB positioning module switches from the UWB base station mode to the UWB tag mode.

Alternatively, when the positioning apparatus receives first switching indication information, the UWB positioning module switches from the UWB base station mode to the UWB tag mode.

When the positioning apparatus does not meet the foregoing preset condition, the positioning apparatus may be switched from the UWB base station mode to the UWB tag mode, to avoid a decrease in the positioning precision caused by continuing to provide the positioning service for the to-be-positioned tag.

For example, the speed of the positioning apparatus is high and exceeds the first preset value. If the positioning apparatus is continuously used as the UWB base station, the positioning precision of the to-be-positioned tag may decrease. Therefore, the positioning apparatus is switched from the UWB base station mode to the UWB tag mode.

For example, at a moment, the location of the positioning apparatus cannot be known. In this case, the positioning apparatus serving as the UWB base station cannot perform positioning measurement on the to-be-positioned tag. In this case, the positioning apparatus is switched from the UWB base station mode to the UWB tag mode.

For example, the positioning apparatus receives the first switching indication information sent by the positioning server, where the first switching indication information indicates the positioning apparatus to switch from the UWB base station mode to the UWB tag mode. Specifically, the positioning server may determine, based on a quantity of connectable positioning base stations around the to-be-positioned tag, whether to send the first switching indication information to the positioning apparatus. At a moment, when a large quantity of connectable UWB fixed base stations and/or UWB tag-based base stations exist around the to-be-positioned tag, high-precision positioning of the to-be-positioned tag can be ensured. In this case, the positioning server may send the first switching indication information to the positioning apparatus, to avoid the decrease in the positioning precision caused by the positioning apparatus continuing to provide the positioning service for the to-be-positioned tag.

Optionally, the method may further include: performing time synchronization on the positioning apparatus and a UWB base station communicating with the positioning apparatus; or performing time synchronization on the positioning apparatus, the to-be-positioned tag, and a UWB base station communicating with the positioning apparatus.

It should be understood that, in this embodiment of the present disclosure, whether time synchronization is performed on the positioning apparatus and the UWB base station communicating with the positioning apparatus, or whether time synchronization is performed on the positioning apparatus, the to-be-positioned tag, and the UWB base station communicating with the positioning apparatus is related to a positioning method used by the positioning apparatus.

For example, when the TDOA in the foregoing positioning method is used, time synchronization needs to be performed between positioning base stations. To be specific, time synchronization needs to be performed between the positioning apparatus and the UWB base station communicating with the positioning apparatus, but time synchronization does not need to be performed between the to-be-positioned tag and the positioning base stations.

For example, when the TOA in the foregoing positioning method is used, time synchronization needs to be performed on the positioning apparatus, the to-be-positioned tag, and the UWB base station communicating with the positioning apparatus. To be specific, time synchronization needs to be performed between positioning base stations, and time synchronization also needs to be performed between the to-be-positioned tag and the positioning base stations.

Optionally, the first positioning module is an RTK positioning module.

It should be understood that the first positioning module may alternatively be another GNSS positioning module, a BLUETOOTH 5.1 positioning module, or the like.

Optionally, the positioning apparatus is an on-board positioning apparatus.

Figure 9:
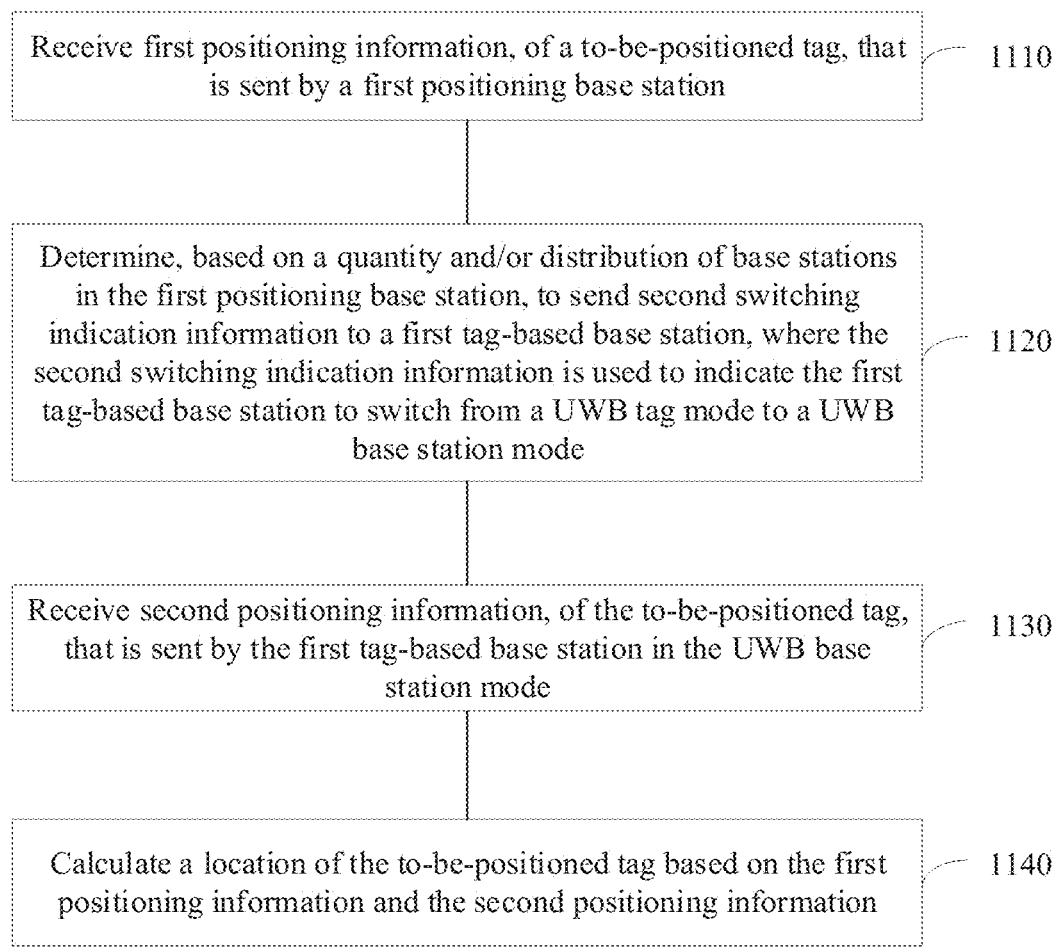
FIG. 9 is a schematic flowchart of another positioning method according to an embodiment of the present disclosure.

FIG. 9 is a schematic flowchart of another positioning method according to an embodiment of the present disclosure. As shown in FIG. 9, the method is applied to a positioning apparatus, and the method may include step 1110 to step 1140.

1110: Receive first positioning information, of a to-be-positioned tag, that is sent by a first positioning base station.

The first positioning base station may include only a UWB fixed base station, or may include only a UWB tag-based base station, or may include both a UWB fixed base station and a UWB tag-based base station, and the first positioning information is information about positioning measurement performed by the UWB fixed base station and/or the UWB tag-based base station on the to-be-positioned tag.

In a possible implementation, if only the UWB fixed base station is a connectable positioning base station near the to-be-positioned tag, the positioning apparatus receives the first positioning information of the to-be-positioned tag from a plurality of UWB fixed base stations, where the first positioning information includes information about positioning measurement performed by the plurality of UWB fixed base stations on the to-be-positioned tag.

In another possible implementation, if both the UWB fixed base station and the UWB tag-based base station are the connectable positioning base stations near the positioning tag, the first positioning information includes information about positioning measurement performed by the UWB fixed base station and the UWB tag-based base station on the to-be-positioned tag.

In another possible implementation, if only the UWB tag-based base station is the connectable positioning base station near the positioning tag, the first positioning information includes information about positioning measurement performed by a plurality of UWB tag-based base stations on the to-be-positioned tag.

1120: Determine, based on a quantity and/or distribution of base stations in the first positioning base station, to send second switching indication information to a first tag-based base station, where the second switching indication information indicates the first tag-based base station to switch from a UWB tag mode to a UWB base station mode.

The first tag-based base station may include one tag-based base station, or may include a plurality of tag-based base stations. This is not limited in this embodiment of the present disclosure.

In this embodiment of the present disclosure, positioning precision of the to-be-positioned tag is not only related to a quantity of positioning base stations, but also related to distribution of the positioning base stations around the to-be-positioned tag. It should be understood that the distribution of the positioning base stations may be understood as distribution density, a topology relationship, and the like of the positioning base stations.

In a possible implementation, when the quantity of base stations in the first positioning base station is small, for example, the quantity is three, and the base stations are insufficient to provide high-precision positioning for the to-be-positioned tag, the positioning apparatus may send the second switching indication information to the first tag-based base station, to indicate the tag-based base station to switch from the UWB tag mode to the UWB base station mode, so that the tag-based base station may be used as the positioning base station to provide a positioning service for the to-be-positioned tag.

In another possible implementation, the distribution of the positioning base stations around the to-be-positioned tag is uneven. For example, when the positioning base stations are all centralized on one side of the to-be-positioned tag, the positioning precision may decrease. In this case, the positioning apparatus may send the second switching indication information to the first tag-based base station, to indicate the tag-based base station to switch from the UWB tag mode to the UWB base station mode, so that the positioning precision of the to-be-positioned tag can be improved. The first tag-based base station may be distributed on the other side of the to-be-positioned tag.

1130: Receive second positioning information, of the to-be-positioned tag, that is sent by the first tag-based base station in the UWB base station mode.

After receiving the first switching indication information, the first tag-based base station switches from the UWB tag mode to the UWB base station mode, and performs, in the UWB base station mode, positioning measurement on the to-be-positioned tag, to obtain the second positioning information.

1140: Calculate a location of the to-be-positioned tag based on the first positioning information and the second positioning information.

The positioning apparatus calculates the location of the to-be-positioned tag based on the received first positioning information and second positioning information of the to-be-positioned tag.

Optionally, the method may further include: determining a precision level of the location of the to-be-positioned tag.

The precision level of the location of the to-be-positioned tag may be determined based on at least one of the following information: a ratio of a sum of a quantity of tag-based base stations in the first positioning base station and a quantity of tag-based base stations in the first tag-based base station to a sum of the quantity of base stations in the first positioning base station and a quantity of base stations in the first tag-based base station; a location of a tag-based base station in the first positioning base station; and a location of the first tag-based base station.

In this embodiment of the present disclosure, because positioning precision of the UWB tag-based base station is lower than positioning precision of the UWB fixed base station, the precision level of the location of the to-be-positioned tag may be determined based on a ratio of a quantity of tag-based base stations in positioning base stations participating in positioning to a quantity of total base stations participating in positioning; or the precision level of the location of the to-be-positioned tag may be determined based on the location of the tag-based base station.

Optionally, in this embodiment of the present disclosure, the positioning apparatus may be a positioning server.

Based on this embodiment of the present disclosure, the positioning server may determine, based on the quantity and/or the distribution of the positioning base stations near the to-be-positioned tag, to send switching indication information to another tag-based base station near the to-be-positioned tag, to indicate the another tag-based base station to switch to the UWB base station mode, to provide the positioning service for the to-be-positioned tag, so that high-precision positioning and positioning continuity of the to-be-positioned tag are ensured.

Figure 10:
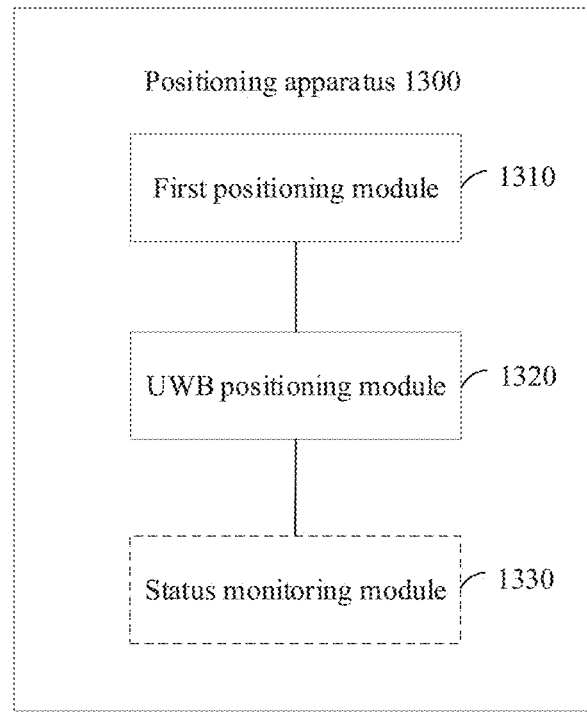
FIG. 10 is a schematic diagram of a structure of a positioning apparatus according to an embodiment of the present disclosure.

FIG. 10 is a schematic structural diagram of a positioning apparatus according to an embodiment of the present disclosure. As shown in FIG. 10, the positioning apparatus 1300 may include a first positioning module 1310 and a UWB positioning module 1320.

The first positioning module 1310 is configured to obtain location information of the positioning apparatus in real time.

The first positioning module 1310 may be an RTK positioning module, another GNSS positioning module, or a BLUETOOTH 5.1 positioning module.

The UWB positioning module 1320 is configured to receive a positioning request message sent by a to-be-positioned tag, where the positioning request message includes identification information of the to-be-positioned tag.

The to-be-positioned tag is a UWB positioning tag, and may broadcast the positioning request information to surroundings. The positioning request message is a UWB signal.

The UWB positioning module 1320 is further configured to: after receiving the positioning request message, determine whether the UWB positioning module is in a UWB base station mode.

The UWB positioning module 1320 is further configured to perform, in UWB base station mode, positioning measurement on the to-be-positioned tag based on the location information and the identification information.

Optionally, the UWB positioning module 1320 includes a UWB tag mode and the UWB base station mode, and the positioning apparatus 1300 may further include: a status monitoring module 1330, where the status monitoring module is configured to monitor a status of the positioning apparatus 1300; and before the performing positioning measurement on the to-be-positioned tag based on the location information and the identification information, when the status of the positioning apparatus meets a preset condition, the UWB positioning module 1320 is further configured to: if the UWB positioning module is not in the UWB base station mode, switch from the UWB tag mode to the UWB base station mode.

Optionally, the UWB positioning module 1320 includes a UWB tag module and a UWB base station module, and the positioning apparatus 1300 may further include: a status monitoring module 1330 configured to monitor a status of the positioning apparatus 1300. Before the performing positioning measurement on the to-be-positioned tag based on the location information and the identification information, when the status of the positioning apparatus meets a preset condition, the UWB positioning module 1320 is further configured to: if the UWB positioning module is not in the UWB base station mode, disable the UWB tag module and enable the UWB base station module, so that the UWB positioning module enters the UWB base station mode.

Optionally, the UWB positioning module 1320 is further configured to: when the status of the positioning apparatus does not meet the preset condition, switch from the UWB base station mode to the UWB tag mode. Alternatively, when the positioning apparatus receives first switching indication information, the UWB positioning module switches from the UWB base station mode to the UWB tag mode.

Optionally, when the status of the positioning apparatus does not meet the preset condition, the UWB positioning module is further configured to: disable the UWB base station module and enable the UWB tag module, so that the UWB positioning module enters the UWB tag mode.

Alternatively, when the positioning apparatus receives first switching indication information, the UWB positioning module disables the UWB base station module and enables the UWB tag module, so that the UWB positioning module enters the UWB tag mode.

Optionally, the preset condition includes that a location of the positioning apparatus is known; or the preset condition includes that a location of the positioning apparatus is known and at least one of the following conditions: a speed of the positioning apparatus is less than or equal to a first preset value; and the positioning apparatus receives second switching indication information.

Optionally, the UWB positioning module further includes: a time synchronization module configured to perform time synchronization on the positioning apparatus and a UWB base station communicating with the positioning apparatus; or configured to perform time synchronization on the positioning apparatus, the to-be-positioned tag, and a UWB base station communicating with the positioning apparatus.

Optionally, the first positioning module is a RTK positioning module.

Optionally, the positioning apparatus is an on-board positioning apparatus.

Figure 11:
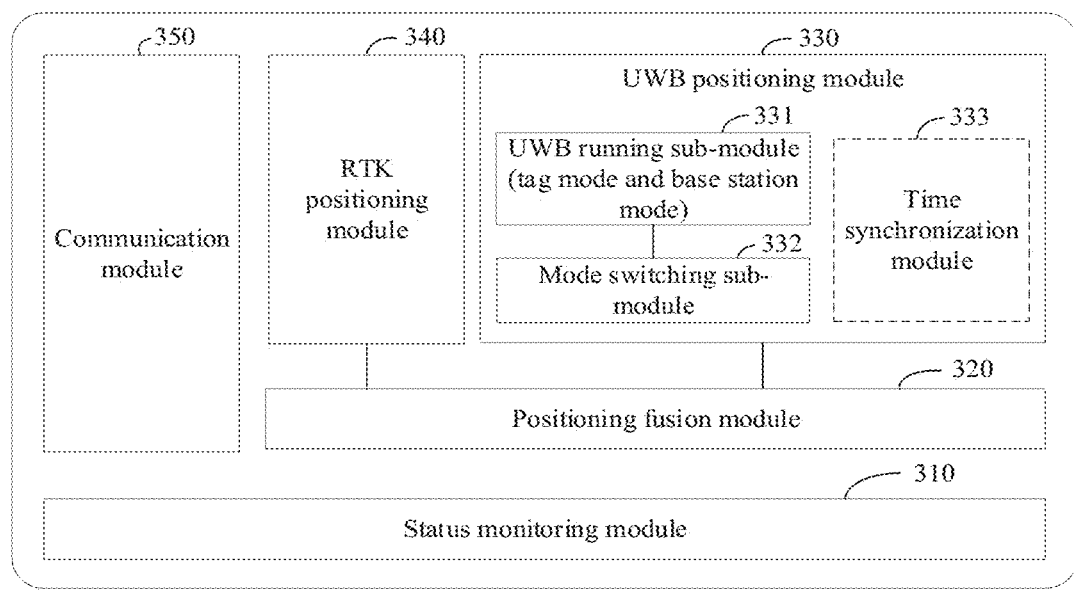
FIG. 11 is a schematic diagram of a structure of another positioning apparatus according to an embodiment of the present disclosure.

FIG. 11 is a schematic diagram of a structure of another positioning apparatus according to an embodiment of the present disclosure. As shown in FIG. 11, the positioning apparatus may include a status monitoring module 310, a positioning fusion module 320, and a communication module 350.

The positioning fusion module 320 may include a first positioning module 340 and a UWB positioning module 330.

The first positioning module 340 may be an RTK positioning module, another GNSS positioning module, a BLUETOOTH 5.1 positioning module, or the like.

The UWB positioning module 330 may include a UWB running sub-module 331 and a mode switching sub-module 332. The UWB running sub-module 331 may include a UWB tag mode and a UWB base station mode.

Optionally, the UWB positioning module 330 may further include a time synchronization module 333. The time synchronization module 333 is configured to perform time synchronization between the positioning apparatus and a positioning base station or a server.

The status monitoring module 310 may be configured to monitor a status of the positioning apparatus in real time, for example, monitor a speed and a location of the positioning apparatus.

The communication module 350 is configured to communicate with a communication base station, a server, and the like, for example configured to receive switching indication information sent by a positioning server.

It should be understood that the communication module 350 may also be integrated into the UWB positioning module 330. This is not limited in this embodiment of the present disclosure.

In this embodiment of the present disclosure, when the status of the positioning apparatus meets a preset condition, the mode switching sub-module 332 may indicate the UWB running sub-module 331 to perform mode switching, for example, to switch from the UWB tag mode to the UWB base station mode, or switch from the UWB base station mode to the UWB tag mode.

Figure 12:
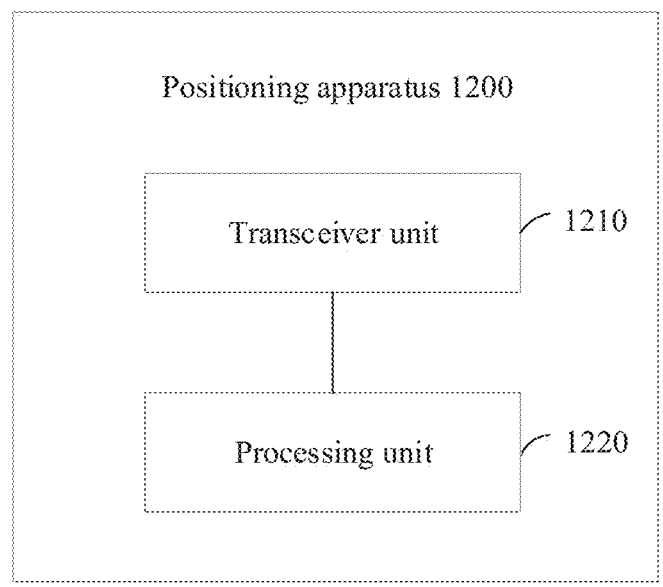
FIG. 12 is a schematic diagram of a structure of another positioning apparatus according to an embodiment of the present disclosure.

FIG. 12 is a schematic diagram of a structure of another positioning apparatus according to an embodiment of the present disclosure. As shown in FIG. 12, the positioning apparatus 1200 may include a transceiver unit 1210 and a processing unit 1220.

The transceiver unit 1210 is configured to receive first positioning information, of a to-be-positioned tag, that is sent by a first positioning base station.

The processing unit 1220 is configured to determine, based on a quantity and/or distribution of base stations in the first positioning base station, to send second switching indication information to a first tag-based base station, where the second switching indication information indicates the first tag-based base station to switch from a UWB tag mode to a UWB base station mode.

The transceiver unit 1210 is further configured to receive second positioning information, of the to-be-positioned tag, that is sent by the first tag-based base station in the UWB base station mode.

The processing unit 1220 is further configured to calculate a location of the to-be-positioned tag based on the first positioning information and the second positioning information.

Optionally, the processing unit 1220 is further configured to determine a precision level of the location of the to-be-positioned tag.

Optionally, the precision level is determined based on at least one of the following information: a ratio of a sum of a quantity of tag-based base stations in the first positioning base station and a quantity of tag-based base stations in the first tag-based base station to a sum of the quantity of base stations in the first positioning base station and a quantity of base stations in the first tag-based base station; a location of a tag-based base station in the first positioning base station; and a location of the first tag-based base station.

Optionally, the positioning apparatus 1200 is a positioning server.

An embodiment of the present disclosure further provides a positioning system, and the positioning system includes the positioning apparatus and/or the positioning server in any one of the foregoing possible implementations.

An embodiment of the present disclosure further provides a chip, where the chip includes a processor and a communication interface. The communication interface is configured to receive a signal and transmit the signal to the processor. The processor processes the signal, so that the positioning method according to any one of the foregoing implementations is performed.

An embodiment of the present disclosure further provides a computer-readable storage medium, where the computer-readable storage medium stores computer instructions. When the computer instructions are run on a computer, the positioning method according to any one of the foregoing implementations is performed.

An embodiment of the present disclosure further provides a computer program product. When the computer program product runs on a computer, the positioning method according to any one of the foregoing implementations is performed.

Terminologies such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within the process and/or the execution thread, and the component may be located on one computer and/or distributed between two or more computers. In addition, these components may be executed in various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random-access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A positioning apparatus comprising:
   a first positioning system configured to obtain location information of the positioning apparatus in real time; and
   an ultra-wide-band (UWB) positioning system configured to:
      receive, from a to-be-positioned tag, a positioning request message comprising identification information of the to-be-positioned tag;
      determine, after receiving the positioning request message, whether the UWB positioning system is in a UWB base station mode; and
      perform, when the UWB positioning system is in the UWB base station mode, a positioning measurement on the to-be-positioned tag based on the location information and the identification information.

2. The positioning apparatus of claim 1, wherein the UWB positioning system comprises a UWB tag mode and the UWB base station mode, and wherein the positioning apparatus further comprises a status monitor configured to monitor a status of the positioning apparatus, and wherein, before performing the positioning measurement, the UWB positioning system is further configured to switch from the UWB tag mode to the UWB base station mode when the status of the positioning apparatus meets a preset condition and when the UWB positioning system is not in the UWB base station mode.

3. The positioning apparatus of claim 2, wherein when the status of the positioning apparatus does not meet the preset condition, the UWB positioning system is further configured to:

switch from the UWB base station mode to the UWB tag mode; or switch, when the positioning apparatus receives first switching indication information, from the UWB base station mode to the UWB tag mode.

4. The positioning apparatus of claim 3, wherein the UWB positioning system comprises a UWB tag system and a UWB base station system, and wherein the positioning apparatus further comprises:

a status monitor configured to monitor a status of the positioning apparatus, and wherein before performing the positioning measurement, the UWB positioning system is further configured to disable the UWB tag system and enable the UWB base station system so that the UWB positioning system enters the UWB base station mode when the status of the positioning apparatus meets a preset condition and when the UWB positioning system is not in the UWB base station mode.

5. The positioning apparatus of claim 4, wherein the UWB positioning system is further configured to:

disable, when the status of the positioning apparatus does not meet the preset condition, the UWB base station system and enable the UWB tag system so that the UWB positioning system enters the UWB tag mode; or disable, when the positioning apparatus receives first switching indication information, the UWB base station system and enable the UWB tag system so that the UWB positioning system enters the UWB tag mode.

6. The positioning apparatus of claim 5, wherein the preset condition comprises that a location of the positioning apparatus is known, or wherein the preset condition comprises that the location of the positioning apparatus is known and at least one of the following conditions:

a speed of the positioning apparatus is less than or equal to a first preset value; or the positioning apparatus receives second switching indication information.

7. The positioning apparatus of claim 6, wherein the UWB positioning system further comprises a time synchronizer configured to:

perform time synchronization on the positioning apparatus and a UWB base station communicating with the positioning apparatus; or perform time synchronization on the positioning apparatus, the to-be-positioned tag, and the UWB base station communicating with the positioning apparatus.

8. The positioning apparatus of claim 7, wherein the first positioning system is a real-time kinematic (RTK) positioning system.

9. The positioning apparatus of claim 8, wherein the positioning apparatus is an on-board positioning apparatus.

10. A method, implemented by a positioning apparatus, the method comprising:

obtaining, by a first positioning system of the positioning apparatus, location information of the positioning apparatus in real time;

receiving, from a to-be-positioned tag and by an ultra-wide-band (UWB) positioning system of the positioning apparatus, a positioning request message comprising identification information of the to-be-positioned tag;

determining, by the UWB positioning system after receiving the positioning request message, whether the UWB positioning system is in a UWB base station mode; and performing, by the UWB positioning system when the UWB positioning system is in the UWB base station mode, a positioning measurement on the to-be-positioned tag based on the location information and the identification information.

11. The method of claim 10, further comprising monitoring, by a status monitoring system, a status of the positioning apparatus, and before performing, by the UWB positioning system, the positioning measurement, disabling, by the UWB positioning system, a UWB tag system and enabling a UWB base station system so that the UWB positioning system enters the UWB base station mode when the status of the positioning apparatus meets a preset condition and when the UWB positioning system is not in the UWB base station mode.

12. The method of claim 11, further comprising monitoring, by a status monitor of the positioning apparatus, a status of the positioning apparatus, and wherein before performing the positioning measurement, switching, by the UWB positioning system, from a UWB tag mode to a UWB base station mode when the status of the positioning apparatus meets a preset condition and when the UWB positioning system is not in the UWB base station mode.

13. The method of claim 12, further comprising switching, by the UWB positioning system, from the UWB base station mode to the UWB tag mode when the status of the positioning apparatus does not meet the preset condition or when the positioning apparatus receives first switching indication information.

14. The method of claim 12, further comprising:

disabling, by the UWB positioning system, the UWB base station system and enabling the UWB tag system so that the UWB positioning system enters the UWB tag mode when the status of the positioning apparatus does not meet the preset condition; or disabling, by the UWB positioning system, the UWB base station system and enabling the UWB tag system so that the UWB positioning system enters the UWB tag mode when the positioning apparatus receives first switching indication information and the status of the positioning apparatus does not meet the preset condition.

15. The method of claim 14, wherein the preset condition comprises that a location of the positioning apparatus is known, or wherein the preset condition comprises that the location of the positioning apparatus is known and at least one of the following conditions:

a speed of the positioning apparatus is less than or equal to a first preset value; or the positioning apparatus receives second switching indication information.

16. The method of claim 15, further comprising:

performing time synchronization on the positioning apparatus and a UWB base station communicating with the positioning apparatus; or performing time synchronization on the positioning apparatus, the to-be-positioned tag, and the UWB base station communicating with the positioning apparatus.

17. The method of claim 16, wherein the first positioning system is a real-time kinematic (RTK) positioning system.

18. The method of claim 17, wherein the positioning apparatus is an on-board positioning apparatus.

19. A chip comprising:

a communication interface configured to receive a signal and transmit the signal; and a processor configured to receive the signal from the communication interface and process the signal to:

obtain location information of a positioning apparatus in real time;

receive, from a to-be-positioned tag, a positioning request message comprising identification information of the to-be-positioned tag;

determine, after receiving the positioning request message, whether an ultra-wide-band (UWB) positioning system is in a UWB base station mode; and perform, when the UWB positioning system is in the UWB base station mode, a positioning measurement on the to-be-positioned tag based on the location information and the identification information.

20. The chip of claim 19, wherein the processor is further configured to process the signal to:

monitor a status of the positioning apparatus; and disable, prior to performing the positioning measurement on the to-be-positioned tag, when the status of the positioning apparatus meets a preset condition and when the UWB positioning system is not in the UWB base station mode, a UWB tag system and enable a UWB base station system so that the UWB positioning system enters the UWB base station mode.

* * * * *